(12) United States Patent
Kuo et al.

(10) Patent No.: US 10,154,108 B2
(45) Date of Patent: Dec. 11, 2018

(54) METHOD AND SYSTEM FOR BROKERING BETWEEN DEVICES AND NETWORK SERVICES

(71) Applicant: INDUSTRIAL TECHNOLOGY RESEARCH INSTITUTE, Hsinchu (TW)

(72) Inventors: Wen-Hsing Kuo, Taichung (TW); Tein-Yaw David Chung, Taoyuan (TW); Ching-Yao Wang, Tainan (TW); Yian-Shu Chu, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/821,691

(22) Filed: Nov. 22, 2017

(65) Prior Publication Data

US 2018/0097903 A1  Apr. 5, 2018

Related U.S. Application Data

(63) Continuation of application No. 14/445,386, filed on Jul. 29, 2014.

(30) Foreign Application Priority Data

Dec. 23, 2013 (TW) .............................. 102147823 A

(51) Int. Cl.
*H04L 29/08* (2006.01)
*H04L 12/58* (2006.01)
(Continued)

(52) U.S. Cl.
CPC ...... *H04L 67/2809* (2013.01); *H04L 41/5041* (2013.01); *H04L 51/14* (2013.01);
(Continued)

(58) Field of Classification Search
CPC ......... H04L 67/02; H04L 67/04; H04L 67/16; H04L 67/28; H04L 67/2833; H04L 67/30;
(Continued)

(56) References Cited

U.S. PATENT DOCUMENTS 5,742,745 A  4/1998 Sugikawa et al.
7,031,700 B1  4/2006 Weaver et al.
(Continued)

FOREIGN PATENT DOCUMENTS

CN  1181651 C  12/2004
CN  101505328 A  8/2009
(Continued)

OTHER PUBLICATIONS

Chinese Office Action dated Aug. 1, 2017 as received in application No. 201410037024.4 [Machine Translation].
(Continued)

*Primary Examiner* — Ramy M Osman
(74) *Attorney, Agent, or Firm* — Maschoff Brennan

(57) ABSTRACT

According to an exemplary embodiment, a method for brokering between devices and network services provides a platform for brokering between at least one device and at least one service group, and uses a brokering service module on the service platform to execute: using a computing device to compute a correlation between a thing and another thing, thereby computing a correlation between a thing and a service group of the at least one service group; for a service group of the at least one service group, using the computing device to compute the correlation between each of at least one thing and a service group of the at least one service group; for a device corresponding to the thing, brokering one or more service groups; and for a service group of the at least one service group, brokering one or more devices corresponding to one or more things.

18 Claims, 12 Drawing Sheets

(51) Int. Cl.
  *H04L 12/24* (2006.01)
  *H04L 29/06* (2006.01)
(52) U.S. Cl.
  CPC .......... *H04L 67/28* (2013.01); *H04L 67/2833* (2013.01); *H04L 67/30* (2013.01); *H04L 63/104* (2013.01)
(58) Field of Classification Search
  CPC . H04L 67/303; H04L 67/306; H04L 67/2809; H04L 51/14; H04L 63/104
  See application file for complete search history.

(56) References Cited

U.S. PATENT DOCUMENTS

| | | | |
|---|---|---|---|
| 8,351,427 | B2 | 1/2013 | Damola et al. |
| 8,897,310 | B2 | 11/2014 | Kim et al. |
| 9,319,149 | B2 | 4/2016 | Luna |
| 9,451,418 | B2 | 9/2016 | Joseph et al. |
| 9,525,753 | B2 | 12/2016 | Shah |
| 2003/0153330 | A1 | 8/2003 | Naghian et al. |
| 2005/0055421 | A1 | 3/2005 | Light et al. |
| 2005/0113123 | A1 | 5/2005 | Torvinen |
| 2006/0168178 | A1 | 7/2006 | Hwang et al. |
| 2006/0234730 | A1 | 10/2006 | Bibr et al. |
| 2007/0136371 | A1* | 6/2007 | Golobay ............... H04L 67/306 |
| 2008/0077261 | A1 | 3/2008 | Baudino et al. |
| 2009/0043876 | A1 | 2/2009 | Zhang et al. |
| 2009/0222517 | A1 | 9/2009 | Kalofonos et al. |
| 2009/0318160 | A1 | 12/2009 | Li |
| 2012/0166538 | A1 | 6/2012 | Son et al. |
| 2012/0173356 | A1 | 7/2012 | Fan et al. |
| 2012/0297406 | A1 | 11/2012 | Bartholomay et al. |
| 2012/0303618 | A1* | 11/2012 | Dutta ............ H04L 67/10 707/737 |
| 2013/0055358 | A1 | 2/2013 | Short et al. |
| 2013/0072217 | A1* | 3/2013 | Zhang ............ H04W 4/02 455/456.1 |
| 2013/0083805 | A1 | 4/2013 | Lu et al. |
| 2013/0091208 | A1 | 4/2013 | Rajakarunanayake et al. |
| 2013/0091209 | A1 | 4/2013 | Bennett et al. |
| 2013/0091211 | A1 | 4/2013 | Diab et al. |
| 2013/0091212 | A1 | 4/2013 | Rajakarunanayake |
| 2013/0091213 | A1 | 4/2013 | Diab et al. |
| 2013/0091216 | A1 | 4/2013 | Rajakarunanayake et al. |
| 2013/0091280 | A1 | 4/2013 | Rajakarunanayake et al. |
| 2013/0091540 | A1 | 4/2013 | Chen et al. |
| 2013/0132865 | A1 | 5/2013 | Li |
| 2014/0075179 | A1 | 3/2014 | Krishnapura et al. |
| 2014/0189786 | A1 | 7/2014 | Castro et al. |
| 2014/0194062 | A1 | 7/2014 | Palin et al. |

FOREIGN PATENT DOCUMENTS

| | | |
|---|---|---|
| EP | 2 582 116 A2 | 4/2013 |
| TW | I260886 B | 8/2006 |
| TW | M416830 U | 11/2011 |

OTHER PUBLICATIONS

Taiwan Office Action dated Nov. 11, 2015 as received in Application No. 102147823.
Gluhak et al. "A Survey on Facilities for Experimental Internet of Things Research," IEEE Communication Magazine, Nov. 2011, pp. 58-67.
Guinard et al., "Sharing using social networks in a composable Web of Things," 2010 8th IEEE International Conference on Pervasive Computing and Communications Workshops (PERCOM Workshops) Mar. 29, 2010, pp. 702-707.
Kamilaris et al., "Lessons Learned from Online Social Networking of Physical Things," 2011 International Conference on Broadband and Wireless Computing, Communication and Applications (BWCCA), Oct. 26, 2011, pp.128-135.
Kamilaris et al., "Social Networking of the Smart Home," 2010 IEEE 21st International Symposium on Personal Indoor and Mobile Radio Communications (PIMRC), Sep. 26, 2010, pp. 2632-2637.
Kshetrimayum, R.K., "An introduction to UWB communication systems," IEEE Potentials, vol. 28, No. 2, Mar./Apr. 2009, pp. 9-13.
LNA organization website. [Online]. Available: http://www.dlna.org/.
Mayer and Guinard, "An extensible Discovery Service for Smart Things," Proceedings of ACM International Workshop on Web of Things, Jun. 2011, Article No. 7, pp. 1-6.
Mayer et al., "Searching in a Web-based Infrastructure for Smart Things," IEEE 3rd International Conference on Internet of Things, Oct. 14, 2012, pp. 119-126.
Mokhtar et al., "A Self-Organising Directory and Matching Service for Opportunistic Social Networking", Proceedings of the 3rd Workshop on Social Network Systems, Article No. 5, Apr. 13, 2010, pp. 1-6.
RFID tutorial, Understanding Radio Frequency Identification (RFID), accessed at https://www.waybackmachine.org/web/20130902084942/http://www.connect802.com/rfid_facts.htm, accessed on Nov. 22, 2017, pp. 1-5.
Shoaib et al., "Architecture of Push Service Based on SNS for Sharing Sensor Information," Green and Smart Technology with Sensor Applications, vol. 338, 2012, pp. 342-346.
The bluetooth organization website. [Online]. Available: https://www.bluetooth.org/.
Wu et al., "M2M: From Mobile to Embedded Internet," IEEE Communication Magazine, vol. 49, No. 4, Apr. 2011, pp. 36-43.
Zigbee Alliance organization website, accessed at https://www.waybackmachine.org/web/20131204005436/http://www.zigbee.org/, accessed on Nov. 22, 2017, pp. 1-2.

* cited by examiner

| Thing | Location | Owner | Brand | Allowed User | Type |
|---|---|---|---|---|---|
| weight | 3 | 5 | | 2 | 1 |
| thing 1 | Wang's home | Wang | XX brand | {Wang, Chen} | camera |
| thing 2 | Wang's home 0 | Wang 0 | OO brand 1 | {Wang} 1 | TV 3 |
| thing 3 | community gate 5 | community committee 1 | XO brand 1 | {Wang, XX, XXXX, XXX} 4 | camera 0 |
| thing 4 | remote site 100 | irrelevant 10 | XX brand 0 | {XX,XXXX,XXX,XXX} 6 | sensor 10 |

FIG. 3

METHOD AND SYSTEM FOR BROKERING BETWEEN DEVICES AND NETWORK SERVICES

CROSS-REFERENCE TO RELATED APPLICATIONS

This non-provisional application claims priority under 35 U.S.C. § 120 on patent application Ser. No. 14/445,386, the entire contents of which are hereby incorporated by reference.

TECHNICAL FIELD

The technical field generally relates to a method and system for brokering between devices and network services.

BACKGROUND

The development of information technologies affects work, social interaction and every other aspects of modern life. As the wireless communication technologies progress, the deployment of hardware devices becomes simple and inexpensive, which accelerates the applications of information technologies at home, transportation, environmental surveillance, medical, and so on. The internet technology also improves with more and more information services become available. Not all the communication protocols of these services are compatible. The known digital video streaming technologies use different specifications, and some of the specifications are proprietary.

An important application field of information technologies is the digital home, where a plurality of sensors and devices of different specifications are connected through different transmission protocols to the gateway for accesses to backend network services. A common scenario is that the digital home service environment is deployed by a single service provider, and the home sensor uses different standards to integrate home devices and connect through set-top box or gateway to remote site services. The remote site service providers collects the device data or set own portal to connect social network so that the users can inquire the status of the sensor, such as, security service provided by security companies. In known technology, user installs proprietary equipment provided the company, such as, monitors and door access control, and the equipment connects through set-top box or gateway to monitor platform in the security company. When the security company detects, such as, doors ajar or intrusions, the user on the social network is notified. This known architecture does not allow the user to select the plurality of home devices, such as, set-top box, gateway, sensor and use or connect simultaneously to a plurality of potential services. As such, many services find it difficult to reach potential users.

Social network is one of the most important technologies, and becomes a center of establishing relationships between many users and third parties. A social network may include specific elements. Through the social network, users may subscribe personal online profiles, list contact information, receive notifications from online services, and set access permission, priority and privacy. A group of users may also establish or extend their specialties and social networks. Social networks may provide many kinds of tools to allow users to informally or voluntarily interact with others, contribute information and participate activities. The users may develop various social application services through the interface provided by the social network platform. Each member of a social network may access the desired service as he/she wishes. The role of actors of a social network may be either a man or a machine, and the connection of the actors may be the relationship of either man-to-machine, man-to-man or machine-to-machine.

In the aforementioned known architecture, no common platform is set up between the network service providers and the home devices. When the social network is directly applied to the home device, problems may arise. For example, the messages from the home device cannot be integrated and processed in advance, and therefore the concept of sharing of service level or promotion function of service level does not exist. Also, the service used by the home device is restricted to the default setting by the device and service providers and the user fails to select the network service to be connected by the device. Or, the user may not learn of the network services promoted by service providers and could not find or broker available network services for the home device.

SUMMARY

The exemplary embodiments of the present disclosure may provide a method and system for brokering between devices and network services.

An exemplary embodiment relates to a method for brokering between devices and network services. The method may comprise: brokering, via a service platform, between at least one device and at least one service group, and using a brokering service module on the service platform to execute: using a computing device to compute a first correlation between one thing and another thing of a plurality of things, thereby computing a second correlation between the thing and a service group of the at least one service group; using the computing device to compute a third correlation between one service group of the at least one service group and each of at least one thing; for a device corresponding to the thing, brokering one or more service groups; and for a service group of the at least one service group, brokering one or more devices corresponding to one or more things.

Another exemplary embodiment relates a system for brokering between devices and network services. The system may comprise a brokering service module, a service group database and a thing database. The brokering service module computes a first correlation between one thing and another thing of a plurality of things, thereby computing a second correlation between the thing and one service group of at least one service group; computes a third correlation between the one service group of the at least one service group and each of at least one thing; for a device corresponding to the thing, brokers one or more service groups; and for a service group of the at least one service group, brokers one or more devices corresponding to one or more things. The thing database stores a data structure of a plurality of things corresponding to a plurality of devices on the device network. The service group database stores at least one data of a plurality of service groups on a service platform.

BRIEF DESCRIPTION OF THE DRAWINGS

FIG. 3 shows an exemplar of computing a correlation between two things, in accordance with an exemplary embodiment.

DETAILED DESCRIPTION

Figure 1A:
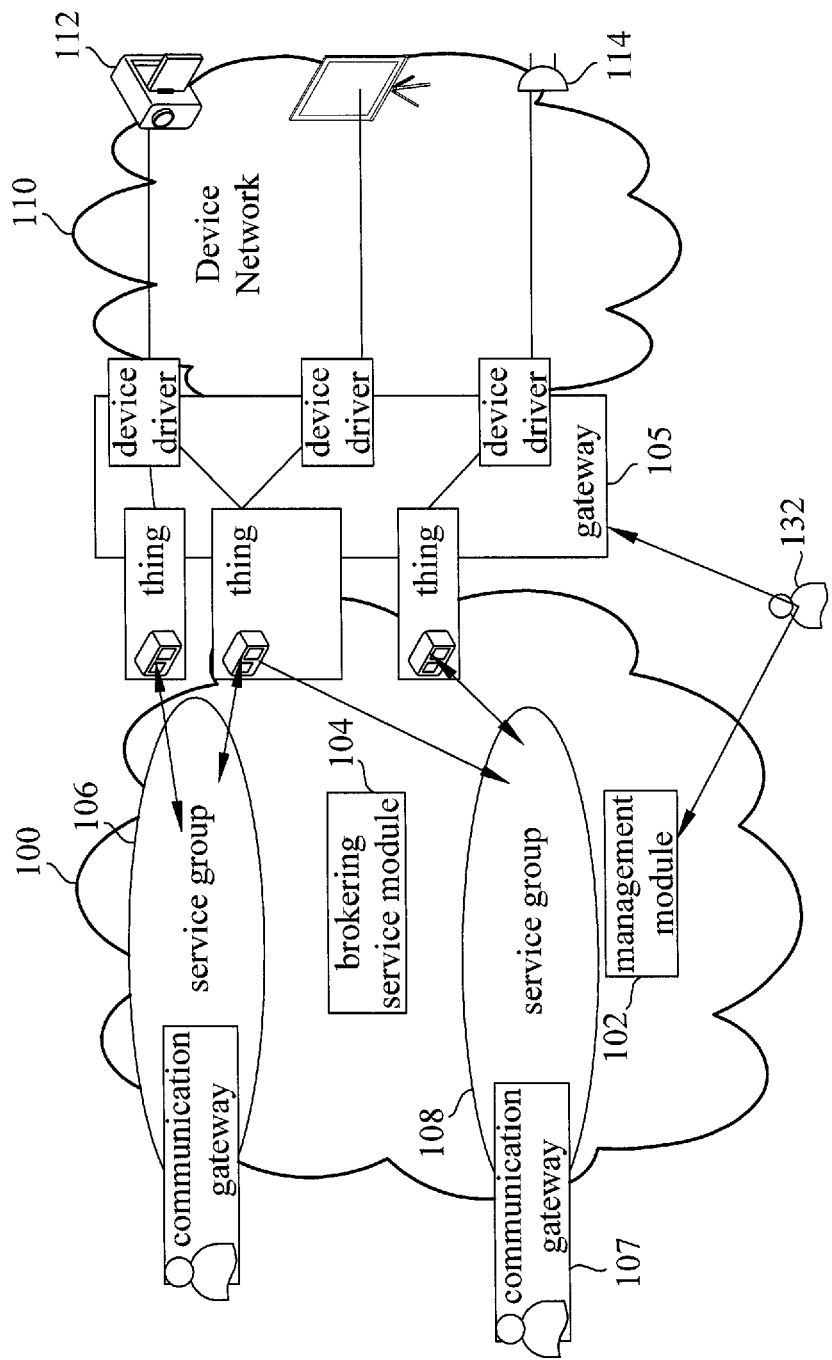
FIG. 1A shows an exemplary schematic view of an application scenario of a service platform of home devices, in accordance with an exemplary embodiment.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

According to exemplary embodiments of the disclosure, a technique for brokering between devices and network services is provided. The technique may interface network services and devices, such as home devices, through a brokering service module, thereby providing a service platform for brokering between service groups and things. On the service platform, users may submit configuration information of the service groups and/or communication gateway to be established. A device on a device network is connected to a home gateway and sets the interface information of accessible things through the gateway. The service brokering module may combine the configuration information, the interface information of things and other information on the service platform, search and recommend one or more related service groups so that the device may be connected to different device(s) and/or service(s). The brokering service module may also recommend, based on configuration information and other information of a newly established service group by the service provider, the newly establish service group to potential user device(s) on the device network. In the exemplary embodiments of the disclosure, a correspondence between a device and a thing may be a one-to-one correspondence, and the thing is defined as a contact window of the device connecting to the service platform. The present application is not limited to such a correspondence, and the correspondence between a thing and a device may also be many-to-one, one-to-many or many-to-many.

FIG. 1A shows an exemplary schematic view of an application scenario of a service platform of home devices, in accordance with an exemplary embodiment. Referring to FIG. 1A, a service platform 100 may comprise a management module 102, a brokering service module 104 and a plurality of service groups. The management module 102 provides basic functions required for service establishment, such as, account management, authority management, billing management, and so on. A user 132 (such as an owner of a device) may register to the service platform 100 and provides related configuration information of one or more service groups and/or a communication gateway to be established. The brokering service module 104 may combine the related configuration information provided by the user, interface information of one or more things, configuration information of the one or more service groups and other information on the service platform 100, and provide brokering between the service groups and things, such as, adding a device such as an internet camera 112, on a device network 110 to at least a service group, such as a service group 106, on the service platform 100; or recommending a service group on the service platform 100 to one or more devices (such as a sensor 114) that may use the recommended service group, on the device network 110. According to an exemplary embodiment of the disclosure, the device may maintain basic attributes and functions without relying on the network function, and then uses the interface information of a thing on the network configured by a gateway 105 to connect to the service platform 100. Then, the service brokering module 104 brokers one or more service groups on the service platform 100 and connects to a user through the one or more service groups. Similarly, a thing in a service group, such as a service group 108, may translate a message through a communication gateway such as a communication gateway 107, into another communication message, and forward the another communication message to the user such as the owner of a device.

The things on the service platform 100 may choose to join one or more service groups. These service groups may be established by users or service providers, and the things may connect and exchange messages to one another. The communication gateway 107 may be such as but not limited to, a social gateway, an electronic mail gateway, a real-time communication gateway, a short message service (SMS) gateway, and so on. According to an exemplary embodiment of the disclosure, the service platform 100 may provide each of the one or more service groups the required management functions, such as connection management, user authentication, account management, billing, and so on. These functions are activated when a user is connected a thing.

Figure 1B:
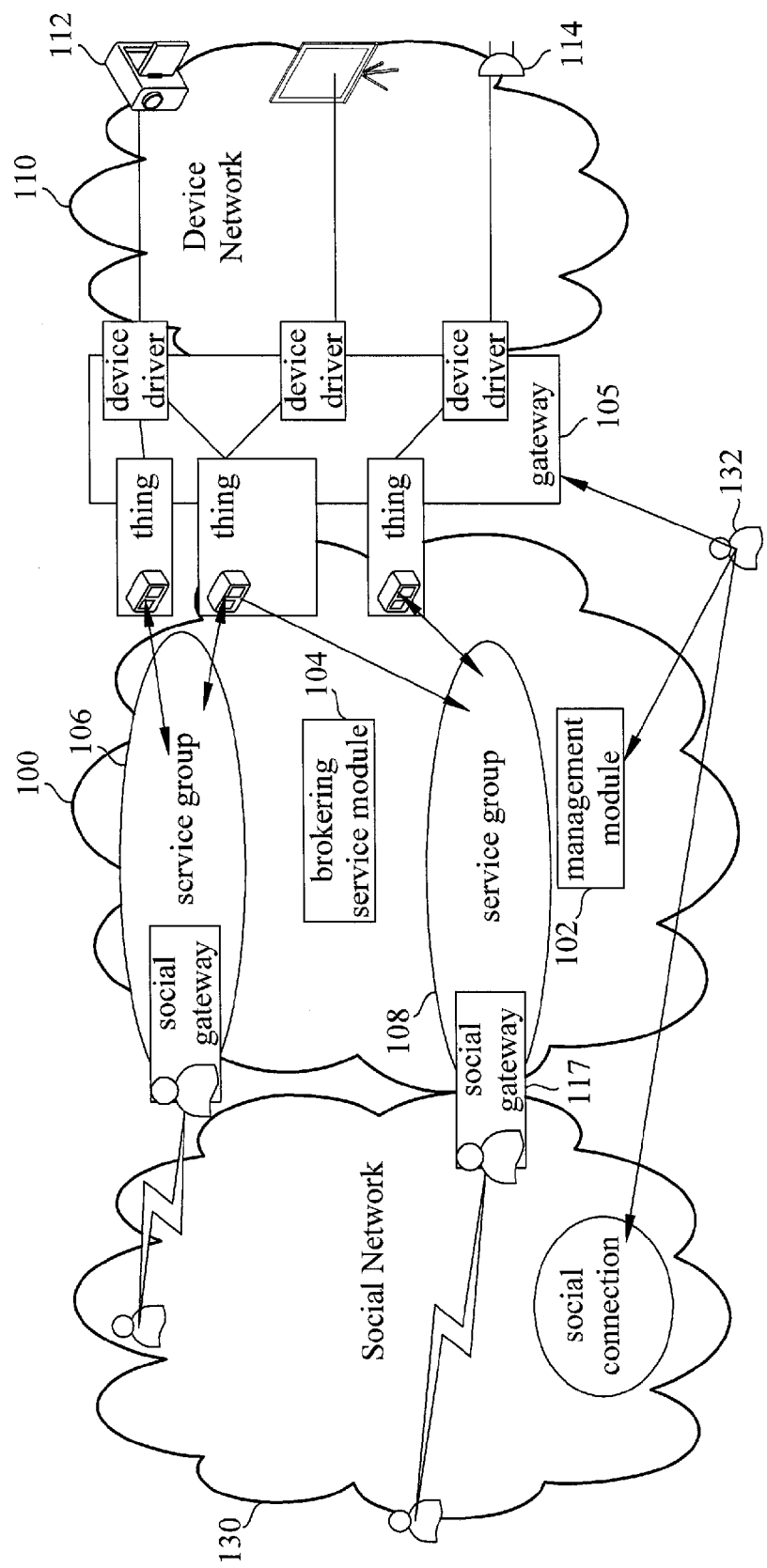
FIG. 1B shows an exemplary schematic view of another application scenario of a service platform of home devices, in accordance with an exemplary embodiment.

Another exemplary embodiment of the disclosure shows that a social network may provide functions of connection management, user authentication, account management, billing, and so on. In the exemplar of FIG. 1B, the communication gateway is a social gateway, wherein the service groups on the service platform 100 use the social gateway to interact with a social network. Referring to FIG. 1B, each identity on a social network 130 may be authenticated first, such as adding a friend or joining a community of interest (COI) to obtain the rights of one-to-one or one-to-many message interaction. The interaction with the social network 130 may be through a plurality kinds of real-time or non-real-time multimedia, such as text, pictures, video, audio, and so on. Through the user authorization, it may allow a third party to access or use the friend list or multimedia interface of the user on the social network 130. Each thing may use a network address, such as a uniform resource locator (URL) or a uniform resource identifier (URI), to broadcast message(s) through the service platform 100, thereby easily accessing to the thing. A social gateway 117 may use a protocol standard to integrate different home devices, and the things of different network protocols on the service platform 100 may execute corresponding applications of each of the service groups.

When the brokering service module 104 starts to recommend one or more service groups to a device, the brokering service module 104 will sort the order (from high to low) of correlations between each of the one or more service groups and the thing corresponding to the device and recommend to a user in that order for allowing the user easy joining. The brokering service module 104 first computes a first correlation between two things (i.e., one thing and another thing), and then computes a second correlation between a thing and each service group, wherein the second correlation between a thing and a service group is defined as a statistics value of the correlations between the thing and each of the things corresponding the members of service groups. The statistics value for example may be a sum, or a mean, or a value obtained by giving a weight to the sum and mean, respectively.

The correlation between a thing and another thing is inversely proportional to the distance between the two things. In other words, the longer the distance between the two things, the lower the correlation between the two things is; and the shorter the distance between the two things, the higher the correlation between the two things is. The correlation between a thing and another thing may be defined as the reciprocal of a related distance between the two things. The related distance between the two things is a sum of the multiplications of the distance between the two things in each quadrant i raised to a power of $k_i$ and a weight of the quadrant i, wherein $k_i$ is a positive fraction greater than 1. The distance between the two things in each quadrant i may be defined by the difference of the two things in the quadrant i, as explained in the following exemplar. The difference of each quadrant i may be obtained according to standard specification in advance.

Figure 2:
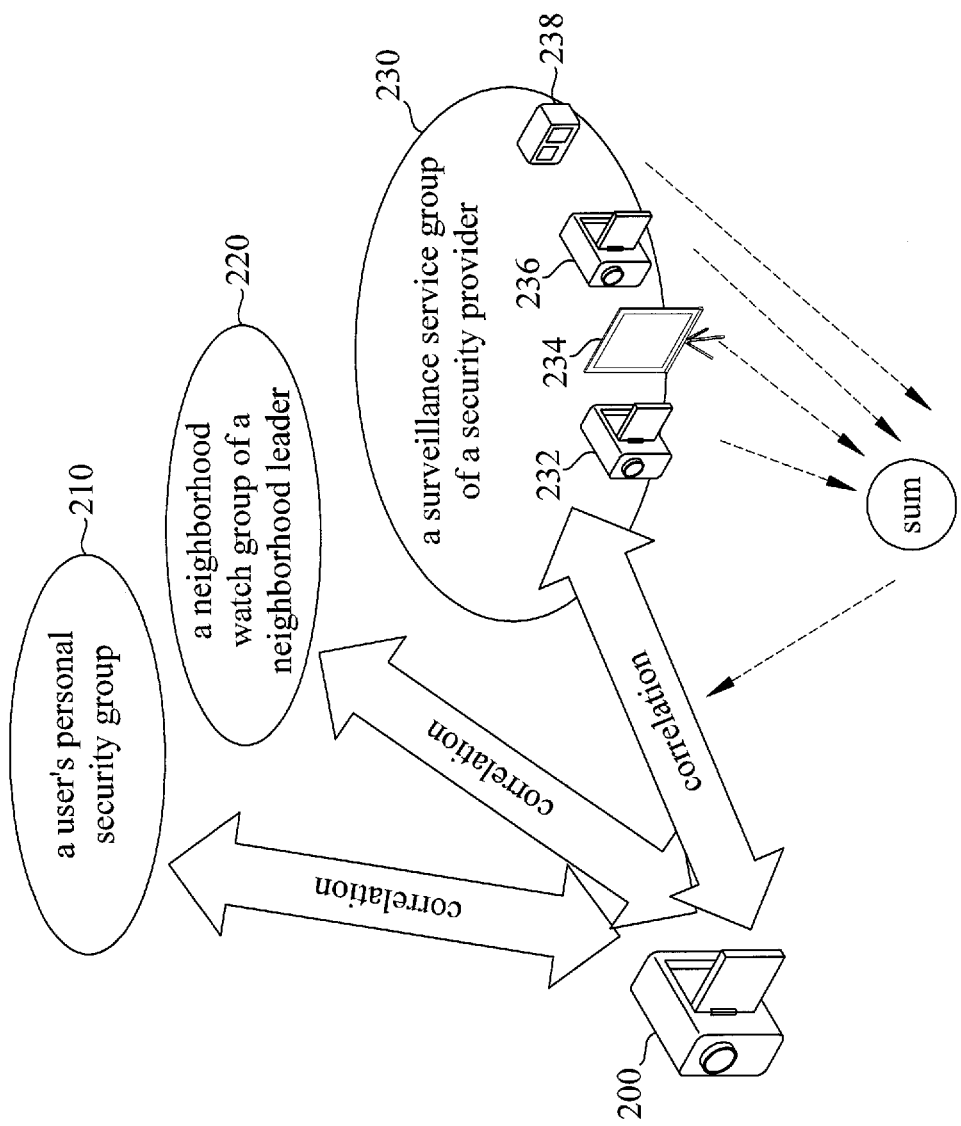
FIG. 2 shows an exemplary schematic view of the correlations between a thing and a service group, in accordance with an embodiment.

FIG. 2 shows an exemplary schematic view of the correlation between a thing and a service group, in accordance with an embodiment. In the exemplar in FIG. 2, there are three service groups, i.e., a user's personal security group 210, a neighborhood watch group 220 of a neighborhood leader, and a surveillance service group 230 of a security provider. Assume that the thing corresponds to a camera 200. The surveillance service group 230 of a security provider has four members, which are a camera 232, a TV 234, a camera 236 and a sensor 238. Then, the correlation between the thing and the surveillance service group 230 is the sum of each correlation between the thing and each of the things corresponding to the four members of the surveillance service group 230, and the thing corresponding to the camera 200. The correlation between the thing corresponding to the camera 200 and each of the things corresponding to the four members of the surveillance service group 230 is defined as the reciprocal of the related distance between the two things. In other words, when the related distance between two things is longer, the correlation between the two things is lower.

According to the exemplary embodiments of the disclosure, each quadrant is an attribute of each of the two things in an aspect. The quadrant may be, for example is, but not limited to a physical location of the device, owner, manufacturer, user, device type, network location, and so on. The physical location is the longitude, latitude and height of the location where the device is placed, which may be obtained through Wi-Fi connection and APGS information of the device. The owner is the owner of the device, which is set by the gateway manager when the device is connected to the gateway. In general, the owner of the device is the manager of the gateway or other member of the home environment. The manufacturer is the manufacturer or the brand of the device, which may be obtained from a summary file descriptor included in the device. The user means the user that may access the device, which is set by the gateway manager. In general, the user is the user or other people related to the device user. The type is the type of the device. The type and the features of the device may be in the summary file included in the device in advance, similar to the manufacturer information. The network location refers to the location of the network connected to the device, such as, company, home, and so on.

FIG. 3 shows an exemplar of computing correlation between two things, in accordance with an exemplary embodiment. In the exemplar of FIG. 3, a service group includes four corresponding things (devices): the first thing is Wang's home internet protocol camera, the second thing is Wang's TV, the third thing is the internet protocol camera of Wang's community, and the fourth thing is another device of the same brand owned by an unrelated owner. The five quadrants are location, owner, brand, allowed user and type. Each quadrant (attribute) corresponds to a weight of 3, 5, 1, 2, 1, respectively. The exemplar of FIG. 3 illustrates the related distance between the quadrants of the four things and the first thing. According to the exemplary embodiment of the disclosure, the related distance between the second thing and the first thing is $3\times0+5\times0+1\times1+2\times1+1\times9=12$, the related distance between the third thing and the first thing is $3\times25+5\times1+1\times1+2\times16+1\times0=113$, and the related distance between the fourth thing and the first thing is $3\times10000+5\times100+1\times1+2\times36+1\times100=30672$. This exemplar use a computation equation as follows, wherein $k_i$ is equal to 2.

The related distance between two things=3×(physical distance)$^2$+5×(connection distance of the owners in social network)$^2$+1×(connection distance of the manufacturers in the social network)$^2$+2×(difference of allowable user sets)$^2$+1×(difference of types)$^2$ As the exemplar of FIG. 3 shows the correlation between the second thing and first thing is the highest (because the related distance is shortest), and correlation between the fourth thing and first thing is the lowest (because the related distance is longest). It may also be seen that the correlation between a device (such as, Wang's home internet protocol camera) and the nearby same-owner device (such as, Wang's TV) is the highest, and the correlation with friends is slightly lower, while the unrelated devices of the same type have a very low correlation. However, if many unrelated users of the same type and same brand devices all use a certain service, the large amount of low correlated devices may accumulate a high correlation, which shows that this service may be recommended to other devices related to this device (such as, Wang's home internet protocol camera). Using the above computation, other devices related to the device may be found and the same scheme may be used to find related services and perform brokering. In other words, according to the exemplary embodiments of the disclosure, it may find correlated devices and/or services from a plurality of different attributes, and then use the correlation between two things for recommendation and brokering.

As aforementioned, according to the exemplary embodiments of the disclosure, it may using a brokering service module to interface network services and devices, thereby providing brokering of service groups and things. Therefore, the service brokering module, in addition to compute the correlation between a thing and a service group, further includes the process of connecting a device to a service platform and adding the device to one or more service groups and process of establishing a service group.

Figure 4:
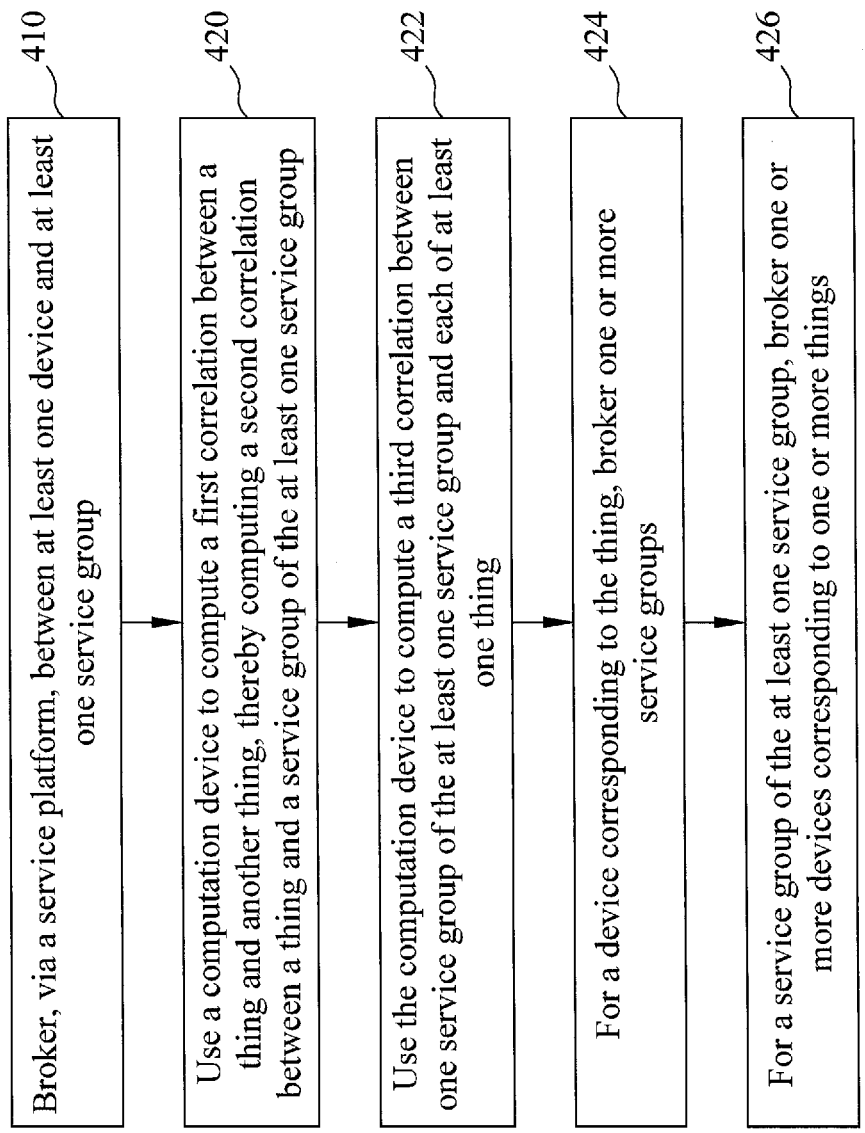
FIG. 4 shows a method for brokering between devices and network services, in accordance with an exemplary embodiment.

Accordingly, FIG. 4 shows a method for brokering between devices and network services, in accordance with an exemplary embodiment. The method is adapted to a system of brokering between device and network service. Referring to FIG. 4, the method for brokering between a device and network service brokers, via a service platform, between at least one device and at least one service group (step 410); and uses a brokering service module on the service platform to execute: using a computation device to compute a first correlation between a thing and another thing, thereby computing a second correlation between a thing and a service group of the at least one service group (step 420); using the computation device to compute a third correlation between one service group of the at least one service group and each of at least one thing (step 422); for a device corresponding to the thing, broker one or more service groups (step 424); and for a service group of the at least one service group, broker one or more devices corresponding to one or more things (step 426).

Figure 5:
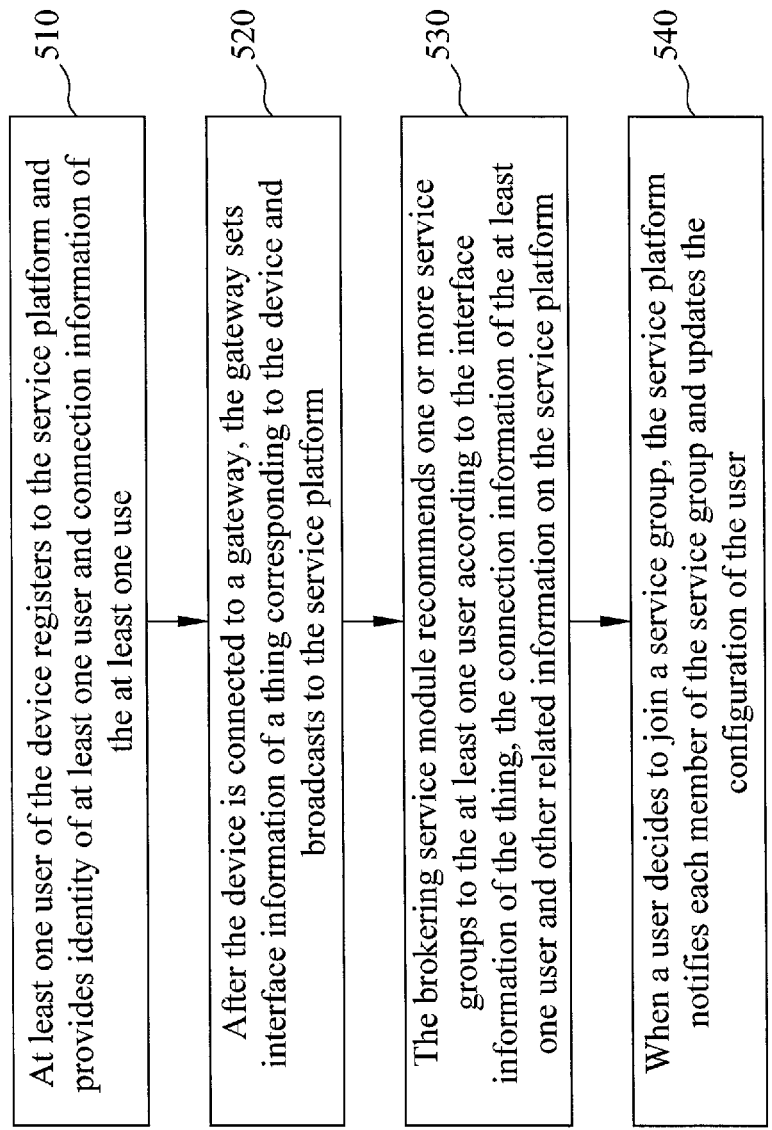
FIG. 5 shows a flowchart of brokering one or more service groups for a device corresponding to a thing, in accordance with an exemplary embodiment.

FIG. 5 shows a flowchart of brokering one or more service groups for a device corresponding to a thing, in accordance with an exemplary embodiment. Referring to the flowchart in FIG. 5, at least one user of the device registers to the service platform and provides identity of at least one user and connection information of the at least one user (step 510). After the device is connected to a gateway, the gateway sets interface information of a thing corresponding to the device and broadcasts to the service platform (step 520). The interface information may be such as data format, location, owner, manufacturer, and so on. The brokering service module recommends one or more service groups to the at least one user according to the interface information of the thing, the connection information of the at least one user and other related information on the service platform (step 530). According to another exemplary embodiment of the disclosure, when a user decides to join a service group, the service platform notifies each member of the service group and updates the configuration of the user (step 540). In step 530, the brokering service module may recommend at least a service group with higher correlation to the user from a plurality of correlations between the device and a plurality of service groups, or at least a service group with correlation higher than a threshold to the user. In other words, the brokering service module compares a plurality of correlations between the device and a plurality of service groups, and selects at least a service group from the plurality of service groups to recommend to the user.

Figure 6:
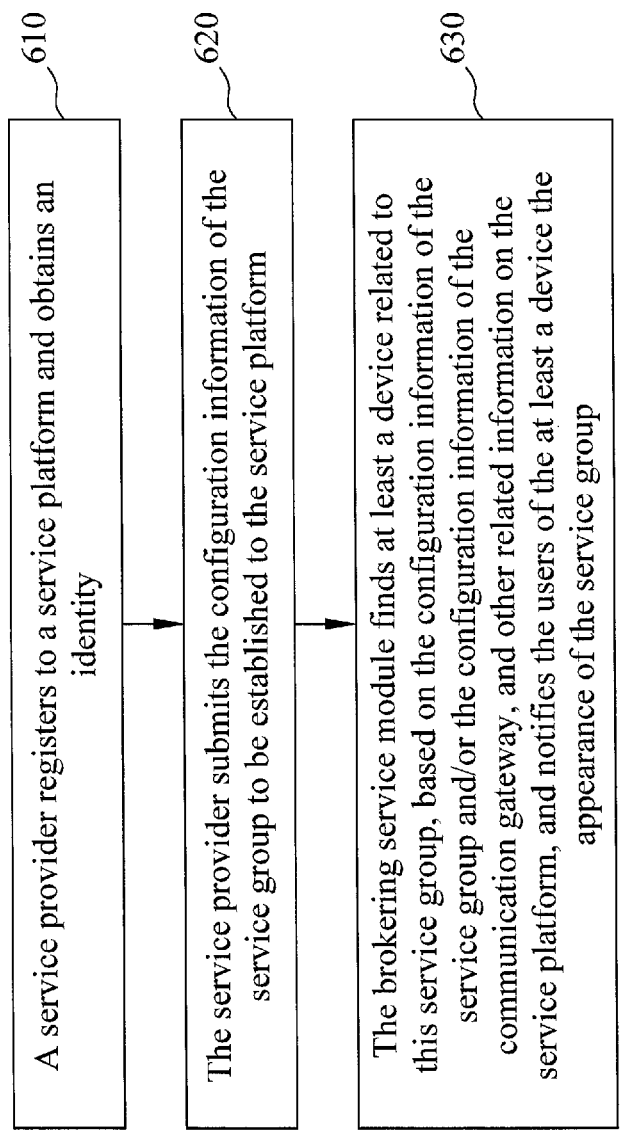
FIG. 6 shows a flowchart of brokering one or more devices for a service group, in accordance with an exemplary embodiment.

FIG. 6 shows a flowchart of brokering one or more devices for a service group, in accordance with an exemplary embodiment. Referring to the flowchart in FIG. 6, a service provider registers to a service platform and obtains an identity (step 610). The service provider submits the configuration information of the service group to be established (such as location, number of devices, charge rate, service type and so on) to the service platform (step 620). If the service group needs to use a communication gateway, the configuration information (such as access scheme, users and so on) of the communication gateway is also submitted to the service platform. The brokering service module finds at least a device related to this service group, based on the configuration information of the service group and/or the configuration information of the communication gateway, and other related information on the service platform, and notifies the users of the at least a device the appearance of the service group (step 630).

Figure 7A:
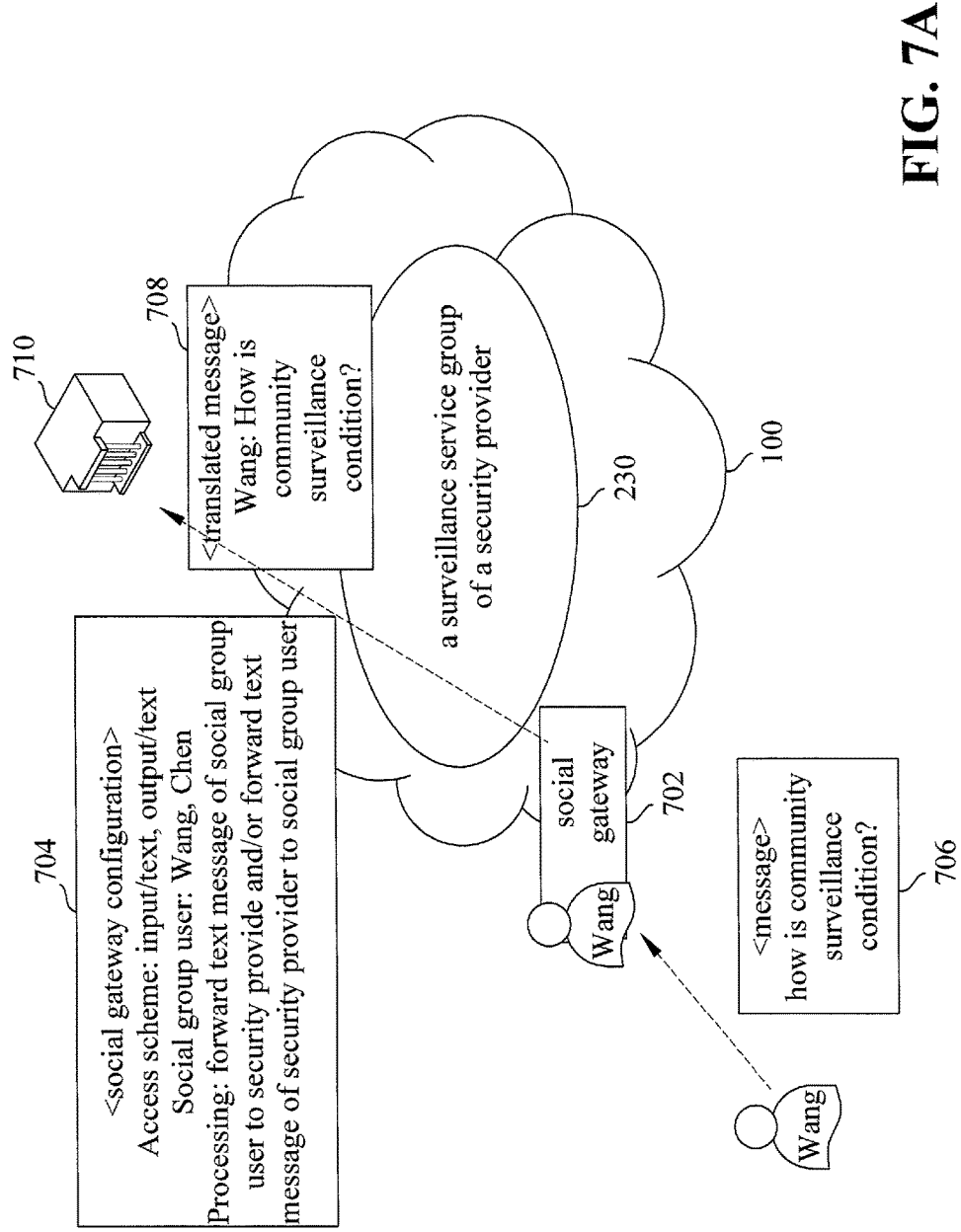
FIG. 7A and FIG. 7B show an exemplar of a service group using a social gateway to interact with a social network, in accordance with an embodiment.
Figure 7B:
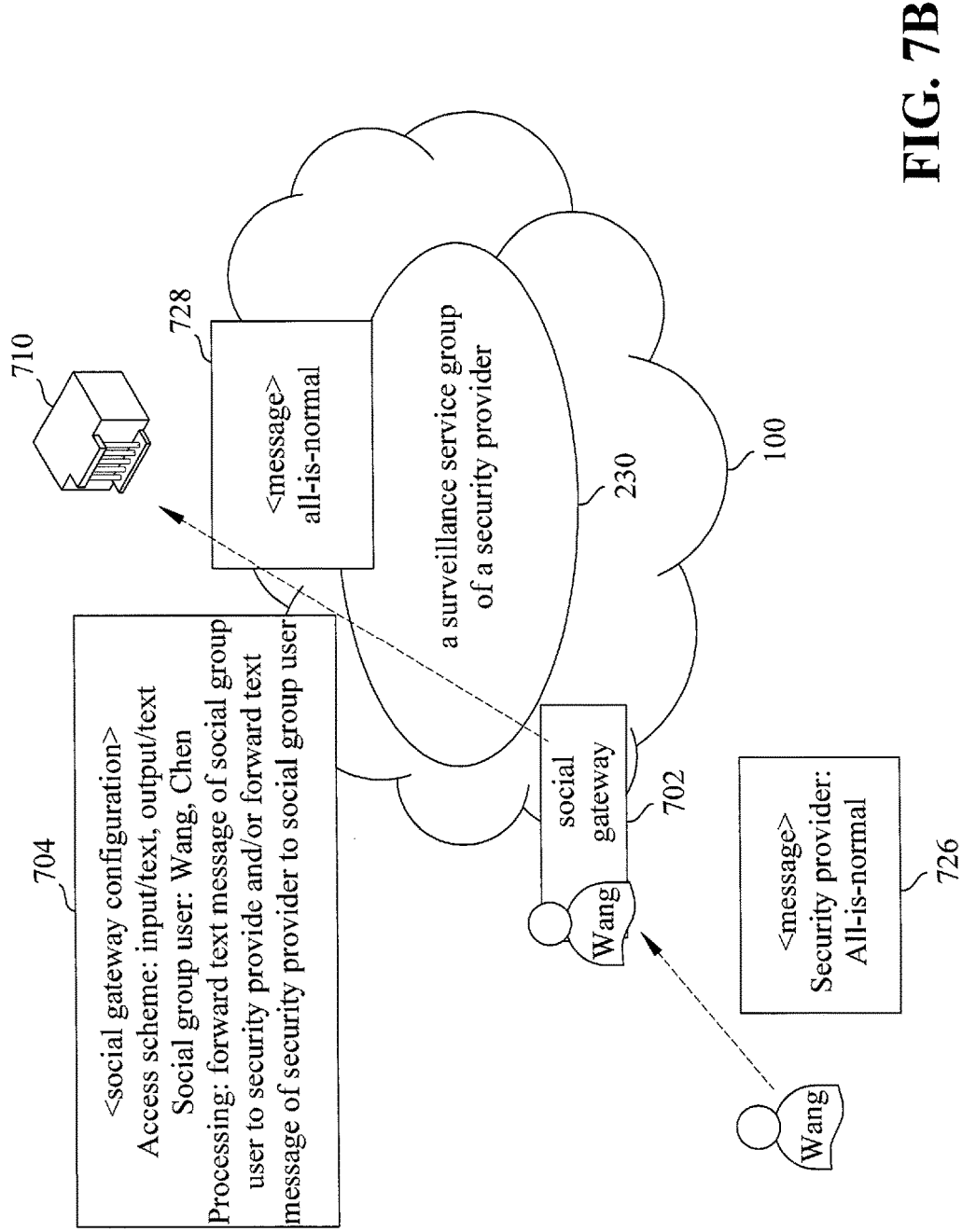

Accordingly, FIG. 7A and FIG. 7B show an exemplar of a service group using a social gateway to interact with a social network, in accordance with an embodiment. Referring to FIG. 7A, a social gateway 702 is set up in a service group (such as, a surveillance service group 230 of a security provider) to interface the service platform 100 and the social network (not shown). The social gateway 702 operates according to a configuration scheme (such as, a social gateway configuration 704) provided by the establisher of the service group. When a user (such as, Wang) on the social network transmits a message (such as, a message 706) to the social gateway 702, the social gateway 702 processes and/or translates the message 706 according to the social gateway configuration 704, and then forwards a translated message 708 to a designated thing 710 (such as a security provider). Similarly, referring to an exemplar in FIG. 7B, the thing 710 (such as the security provider) in the service group (such as the surveillance service group 230 of the security provider) translates a message 726 (such as, all-is-normal) through the social gateway 702 into a social network message 728 (such as, security provider: all-is-normal), and transmits to a designated user, such as Wang.

Figure 8:
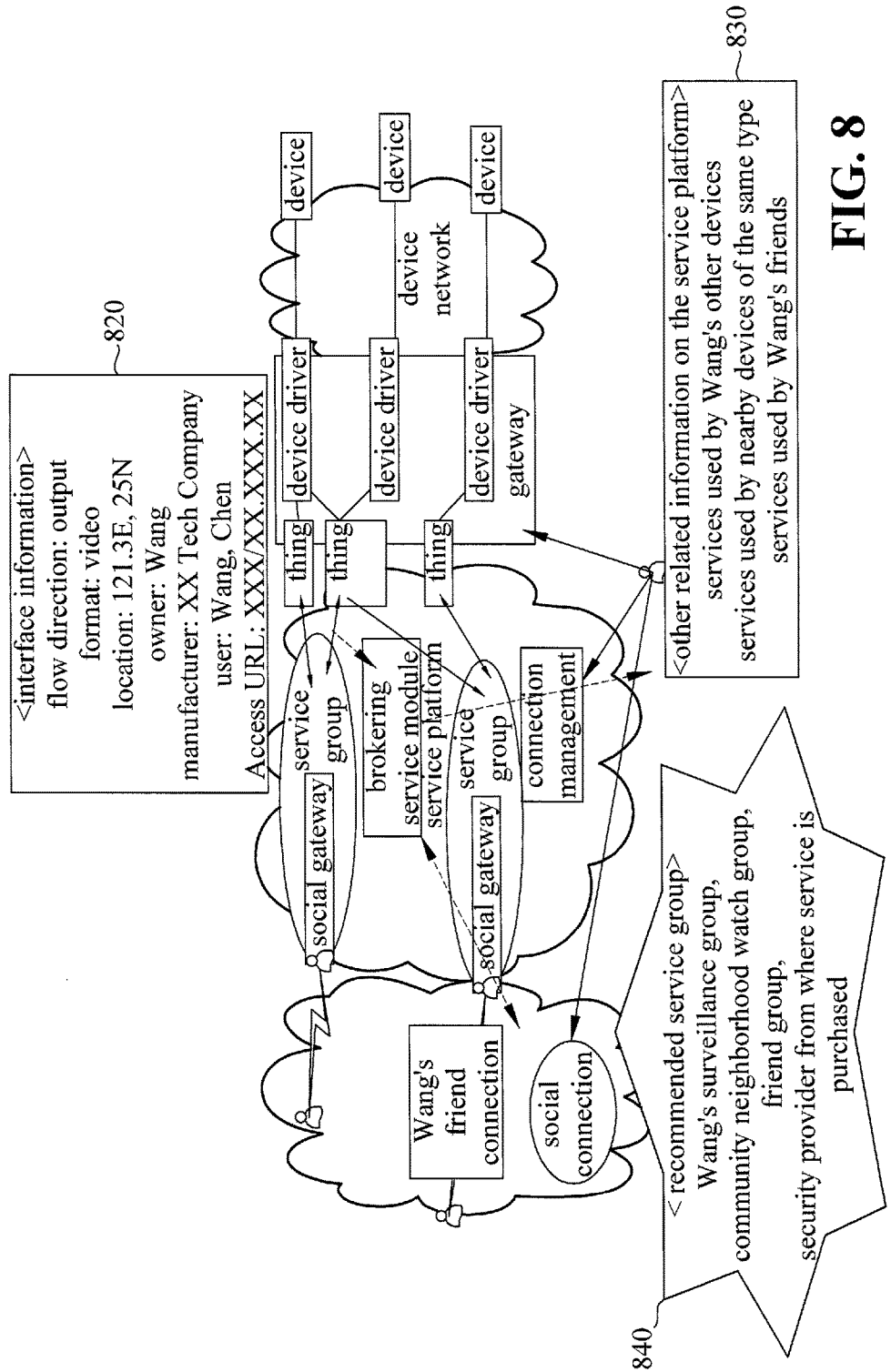
FIG. 8 shows an exemplar of brokering one or more service groups for a device corresponding to a thing, in accordance with an exemplary embodiment.

FIG. 8 shows an exemplar of brokering one or more service groups for a device corresponding to a thing, in accordance with an exemplary embodiment. Referring to the exemplar in FIG. 8, before installing a device (such as, Wang' home internet protocol camera), the user (such as, Wang) registers to the service platform and provides the social group identity and the connection information of the user (such as, the connection information of Wang's friends). After the internet protocol camera is connected to a gateway, the gateway sets the interface information (such as, interface information 820) of a thing corresponding to the internet protocol camera and broadcasts to the service platform. The interface information 820 includes such as a flow direction (such as output), a format (such as video), a location (such as 121.3 towards east, 25 towards north), an owner (such as Wang), a manufacturer (such as a Tech Company), a URL (such as xxx/xx.xxx.xx), and so on. The brokering service module recommends one or more service groups related to the device (such as Wang's home internet protocol camera) to the user based on the interface information of the thing, the connection information the user social group, and other related information 830 on the service platform (such as, services used by Wang's other devices, services used by nearby devices of the same type, services used by Wang's friends). A recommended service group 840 may be such as Wang's surveillance group, a watch group of a community neighborhood, a friend group, a security provider from where the service has been purchased). After the user decides to join the service group, the service platform notifies each of the members of the service group and updates the configuration of the user.

Figure 9:
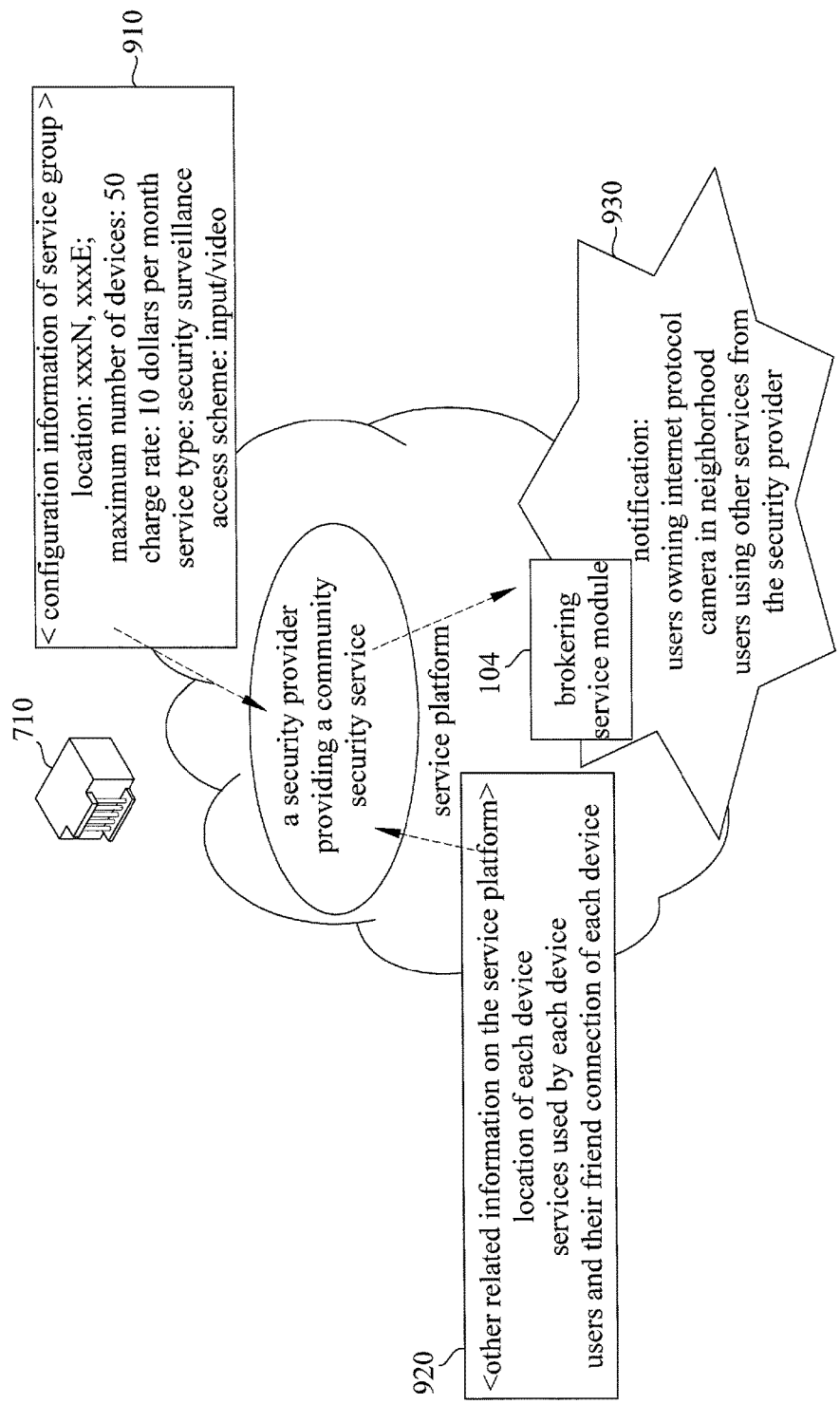
FIG. 9 shows an exemplar of brokering one or more devices for a service group, in accordance with an exemplary embodiment.

FIG. 9 shows an exemplar of brokering one or more devices for a service group, in accordance with an exemplary embodiment. Referring the exemplar in FIG. 9, a service provider (such as, a security provider providing a surveillance service to a community) registers to the service platform with registration information (such as, a company introduction, a company account, collaborating companies), and obtains an identity. The service provider submits the configuration information 910 (such as a location is xxx toward north, xxx towards east; number of devices is 50; a charge rate is 10 dollars per month; a service type is security surveillance; an access scheme is input/video) to the service platform. If the service group needs to use a social gateway, the service group also needs to submit the social gateway's configuration information (such as, the access scheme is input/video, output/text; the processing scheme is directly providing the social user's text message to the security provider and/or directly providing the security provider's text message to the social user) to the service platform. The brokering service module 104 finds at least a device related to the service group based on the service group's configuration information 910 and/or the social gateway's configuration information, and other related information 920 on the service platform (such as, a location of each device, services used by each device, owner and friends of each device, and so on), and notifies the user of the at least a device the appearance of this service group (such as, a notification 930: users owning internet protocol camera in the neighborhood, users using other services from the security provider).

Figure 10:
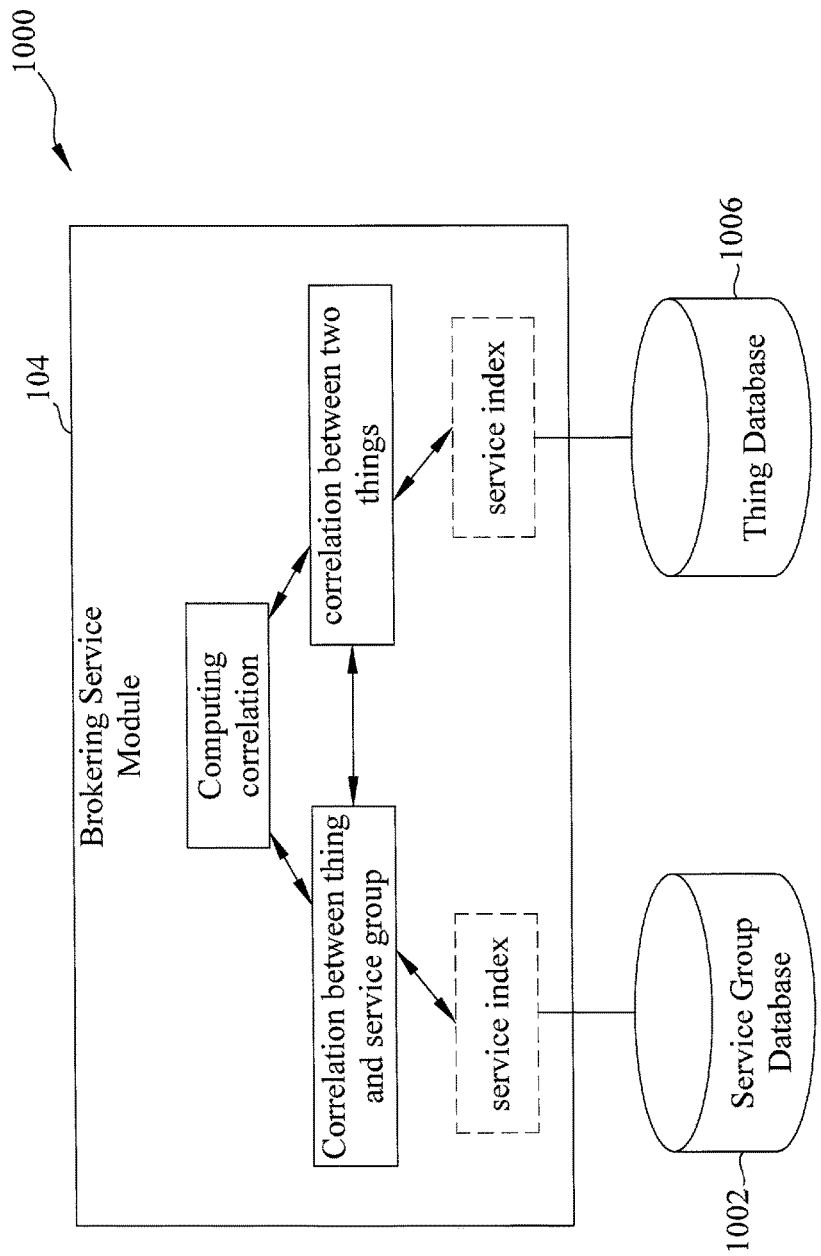
FIG. 10 shows a system for brokering between devices and network services, in accordance with an exemplary embodiment.

Accordingly, FIG. 10 shows a system for brokering between things and network services, in accordance with an exemplary embodiment. Referring to FIG. 10, a system 1000 for brokering between devices and network services may comprise a brokering service module 104, a service group database 1002 and a thing database 1006. The operations executed by the brokering service module 104 are as aforementioned, and is not repeated here. The thing database 1006 stores data structures of a plurality of things corresponding to a plurality of devices on a device network. The service group database 1002 stores at least one data of a plurality of service groups on the service platform 100.

As described in the exemplary embodiments, the brokering service module 104 is configured on the service platform 100, and thereby providing the brokering between at least a service group and at least a thing. In the thing database 1006, the data structure of each thing of the plurality of things at least includes data of a plurality of quadrants of the thing, wherein each quadrant is an attribute of the thing in an aspect. The system 1000 for brokering between devices and network services may further include the management of the service group database 1002 and the thing database 1006, such as using a service group index to realize data maintenance and update of the service group database 1002, and using a thing index to realize data maintenance and update of the thing database 1006. The brokering service module 104 may further use, such as one or more indices, to manage correlations, such as using a service index to manage the correlations between things and service groups, and using a thing index to manage the correlations between two things.

In an exemplary embodiment, the brokering service module 104 may be realized by an integrated circuit; alternatively, in another exemplary embodiment, the brokering service module 104 may be realized by a processing unit reading at least a readable code from a memory device.

According to the exemplary embodiments of the disclosure, a method and system for brokering between devices and service groups is provided. Its technique may provide the brokering between the devices and service groups and collaborate with a service platform, so that a brokering service module on the service platform may be used to compute the correlations between things and service groups, recommend one or more service groups for a device corresponding to a thing, and recommend one or more devices for a service group. According to the exemplary embodiments, for an open platform website allowing services from different service providers, the connection between the service providers and the device users may be more efficient and the opportunity for the connection between service groups and devices is improved.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for brokering between devices to be brokered and network services on a service platform, comprising:
   computing, by a computing device of the service platform, a first correlation between one device and another device of a plurality of devices, thereby computing in the computing device a second correlation between the one device and a service group of a group comprising at least one service group according to the first correlation;
   comparing, by a service brokering module of the service platform, a plurality of second correlations of the device to be brokered and a plurality of service groups, and selecting one or more service groups from the plurality of service groups according to the plurality of the second correlations to recommend to the user;
   adding, by the service brokering module, the device to be brokered to the one or more of the service groups recommended to the user; and
   connecting and exchanging messages, by the device to be brokered, to another device in the one or more service groups;
   wherein the first correlation between the one device and the another one device is a reciprocal of a mathematical correlation between the one device and the another one device, and the second correlation between the one device and the service group of the at least one service group is a statistic value of each first correlation between the one device and each of the plurality of devices corresponding to the members of the service group,
   wherein the mathematical correlation comprises a square of difference between a device type of the one device and a device type of the another device.

2. The method as claimed in claim 1, wherein the mathematical correlation is the sum of multiplication of a distance between the one device and the another device in each quadrant raised to a power of k and a weight of the quadrant, and k is a positive fraction greater than 1.

3. The method as claimed in claim 1, wherein a correspondence between each device of the one or more devices to be brokered corresponding to the one or more devices and a device of the one or more devices is a one-to-one correspondence, and the one device is a contact window of the device to be brokered connecting to the service platform.

4. The method as claimed in claim 1, wherein the service group uses a communication gateway to interact with a network, and said interact includes:
   setting the communication gateway in the service group to interface the service platform and the network, and the communication gateway operating according to a configuration scheme provided by an establisher of the service group; and
   when the communication gateway receiving a message from a user, the communication gateway processing or translating the message according to the configuration scheme, and then forwarding a translated message to the device.

5. The method as claimed in claim 1, wherein the service group uses a communication gateway to interact with a network, and said interact includes:
translating, by the one device in the service group, a message into a network message through the communication gateway, and transmitting to a designated user.

6. The method as claimed in claim 1, wherein the statistic value is one of a sum, a mean and a value obtained by giving a weight to the sum and the mean respectively.

7. The method as claimed in claim 1, wherein the mathematical correlation is the sum of multiplication of the distance between the one device and the another device further in quadrants of at least one of a physical location of the device, a owner of the device, a manufacturer of the device, and a network location.

8. The method as claimed in claim 7, wherein the manufacturer of the device is a brand of the device, and the network location is a location of a network connected to the device.

9. The method as claimed in claim 1, wherein the device type is obtained in summary files included in the device.

10. A system for brokering between devices to be brokered and network services, comprising:
a service platform receiving an interface information of a device or configuration information, and including a management module, a computing device and a brokering service module;
a device database storing a data structure of a plurality of devices corresponding to a plurality of devices to be brokered on an apparatus network; and
a service group database storing at least one data of a plurality of service groups on a service platform,
wherein the management module performs a service establishment,
wherein the computing device computes a first correlation between one device and another device of a plurality of devices, and a second correlation between the one device and one service group of a group comprising at least one service group according to the first correlation,
wherein the brokering service module compares a plurality of second correlations of the device to be brokered and a plurality of service groups, and selects one or more service groups from the plurality of service groups according to the plurality of the second correlations to recommend to the user,
wherein the brokering service module adds the device to be brokered to one or more of the service groups recommended to the user,
wherein the device to be brokered connects and exchanges messages to another device in the one or more service groups,
wherein the first correlation between the one device and the another one device is a reciprocal of a mathematical correlation between the one device and the another one device, and the second correlation between the one device and the service group of the at least one service group is a statistic value of each first correlation between the one device and each of the plurality of devices corresponding to members of the service group, and
wherein the mathematical correlation comprises a square of difference between a device type of the one device and a device type of the another device.

11. The system as claimed in claim 10, wherein the service group uses a communication gateway to interact with a network.

12. The system as claimed in claim 10, wherein a correspondence between each device of the one or more devices to be brokered corresponding to the one or more devices and a device of the one or more devices is a one-to-one correspondence, and the device is a contact window of the device to be brokered connecting to the service platform.

13. The system as claimed in claim 10, wherein the system further includes managing the service group database and the device database.

14. The system as claimed in claim 10, wherein the brokering service module uses at least an index to manage the second correlation between the one device and the service group, and the first correlation between the one device and the another device.

15. The system as claimed in claim 10, wherein the statistic value is one of a sum, a mean and a value obtained by giving a weight to the sum and the mean respectively.

16. The system as claimed in claim 10, wherein the mathematical correlation is a sum of multiplication of a distance between the one device and the another device in quadrants of at least one of a physical location of the device, a owner of the device, a manufacturer of the device, and a network location.

17. The system as claimed in claim 16, wherein the manufacturer of the device is a brand of the device, and the network location is a location of a network connected to the device.

18. The system as claimed in claim 10, wherein the device type is obtained in summary files included in the device.

* * * * *